United States Patent
Cranman et al.

(10) Patent No.: US 9,392,307 B2
(45) Date of Patent: Jul. 12, 2016

(54) SMART PRE-LOAD FOR VIDEO-ON-DEMAND IN AN HTTP ADAPTIVE STREAMING ENVIRONMENT

(71) Applicant: TELEFONAKTIEBOLAGET L M ERICSSON (PUBL), Stockholm (SE)

(72) Inventors: Kevin Cranman, Atlanta, GA (US); Charles Hammett Dasher, Lawrenceville, GA (US)

(73) Assignee: ERICSSON AB, Stockholm (SE)

( * ) Notice: Subject to any disclaimer, the term of this patent is extended or adjusted under 35 U.S.C. 154(b) by 150 days.

(21) Appl. No.: 13/932,049

(22) Filed: Jul. 1, 2013

(65) Prior Publication Data

US 2015/0007239 A1  Jan. 1, 2015

(51) Int. Cl.
- H04N 7/16 (2011.01)
- H04N 21/24 (2011.01)
- H04N 21/472 (2011.01)
- H04N 21/426 (2011.01)
- H04N 21/845 (2011.01)

(52) U.S. Cl.
CPC ....... *H04N 21/2402* (2013.01); *H04N 21/2401* (2013.01); *H04N 21/42607* (2013.01); *H04N 21/47202* (2013.01); *H04N 21/8456* (2013.01)

(58) Field of Classification Search
None
See application file for complete search history.

(56) References Cited

U.S. PATENT DOCUMENTS

| | | |
|---|---|---|
| 2005/0044166 A1 | 2/2005 | Colville et al. |
| 2006/0026663 A1 | 2/2006 | Kortum et al. |
| 2008/0300975 A1 | 12/2008 | Dawson et al. |
| 2010/0095328 A1 * | 4/2010 | Hartung et al. ............... 725/46 |
| 2010/0325656 A1 * | 12/2010 | Hardacker et al. ........... 725/31 |
| 2011/0154382 A1 * | 6/2011 | Chow et al. .................... 725/5 |
| 2012/0002717 A1 * | 1/2012 | Ma et al. ............... 375/240.01 |
| 2012/0192080 A1 | 7/2012 | Lloyd |
| 2013/0080516 A1 * | 3/2013 | Bologh ........... H04N 21/26216 709/203 |

FOREIGN PATENT DOCUMENTS

WO   WO 2010/108053 A1   9/2010

* cited by examiner

*Primary Examiner* — Brian Yenke
*Assistant Examiner* — Samira Monshi

(57) ABSTRACT

A system (e.g., video delivery system, a video-on-demand system, a back office system) and a method are described herein for delivering a selected digital content (e.g., movie, musical composition, application, file) via a network connection to an end-user device (e.g., set-top-box, mobile phone/smart phone, computer, laptop computer, tablet, internet-connected television, gateway device, digital video recorder). In addition, an end-user-device and a method are described herein for receiving the digital content over the connection from the video delivery system.

22 Claims, 7 Drawing Sheets

US 9,392,307 B2

SMART PRE-LOAD FOR VIDEO-ON-DEMAND IN AN HTTP ADAPTIVE STREAMING ENVIRONMENT

TECHNICAL FIELD

The present invention relates to a system (e.g., video delivery system, video-on-demand system, back office system) and a method for delivering a selected digital content (e.g., movie, musical composition, application, file) via a network connection to an end-user device (e.g., set-top-box, mobile phone/smart phone, computer, laptop computer, tablet, internet-connected television, gateway device, digital video recorder). In addition, the present invention relates to an end-user-device and a method for receiving the digital content over the network connection from the system.

BACKGROUND

The traditional video delivery system today may autonomously "push" or "pre-load" a movie over a network connection to an end-user device with the hope that a user of the end-user device will want to purchase the pre-loaded movie to watch. However, if the video delivery system were to "push" or "pre-load" an entire movie to the end-user device and the user of the end-user device did not want watch the movie then this would result in a waste of the network's bandwidth and the end-user device's storage. Accordingly, there is a need to address this shortcoming and other shortcomings associated with a video delivery system that autonomously "pushes" or "pre-loads" a movie to the end-user device. This need and other needs are satisfied by the present invention.

SUMMARY

A system (e.g., video delivery system, video-on-demand system, back office system) and a method for delivering a selected digital content (e.g., movie, musical composition, application, file) via a network connection (e.g., internet connection, cable connection, wireless connection, satellite connection) to an end-user device (e.g., set-top-box, mobile phone/smart phone, computer, laptop computer, tablet, internet-connected television, gateway device, digital video recorder) are described in the independent claims of the present application. In addition, an end-user device and a method for receiving the digital content over the network connection from the video delivery system are described in the independent claims of the present application. Advantageous embodiments of the video delivery system, the end-user device, and the methods have been described in the dependent claims of the present application.

In one aspect, the present invention provides a system for delivering one of a plurality of digital content via a network connection to an end-user device. The system comprises a processor and a memory that stores processor-executable instructions where the processor interfaces with the memory and executes the processor-executable instructions to enable a determining operation, a selecting operation, a pushing operation, and a downloading operation. The determining operation includes determining a bandwidth of the network connection to the end-user device. The selecting operation includes selecting one of the plurality of digital content to push over the network connection to the end-user device. The pushing operation includes pushing a predetermined portion of the selected digital content over the network connection to the end-user device, wherein the predetermined portion of the selected digital content to be pushed is determined based at least on the determined bandwidth network connection to the end-user device. The downloading operation includes downloading a remaining portion of the selected digital content over the network connection to the end-user device such that the end-user device has the remaining portion of the selected digital content locally stored therein to be played when needed by the end-user device (note: the download operation may only be permitted after the user of the end-user device has purchased and begun to play the pushed predetermined portion of the selected digital content). The system has an advantage in that it prevents the waste of the network's bandwidth and the end-user device's storage by not downloading the remaining portion of the selected digital content in the event the user of the end-user device does not want to purchase or play the pushed predetermined portion of the selected digital content.

In another aspect, the present invention provides a method (which is implemented by a system, video delivery system, video-on-demand system, back office system) for delivering one of a plurality of digital content via a network connection to an end-user device. The method comprises a determining step, a selecting step, a pushing step, and a downloading step. The determining step includes determining a bandwidth of the network connection to the end-user device. The selecting step includes selecting one of the plurality of digital content to push over the network connection to the end-user device. The pushing step includes pushing a predetermined portion of the selected digital content over the network connection to the end-user device, wherein the predetermined portion of the selected digital content to be pushed is determined based at least on the determined bandwidth network connection to the end-user device. The downloading step includes downloading a remaining portion of the selected digital content over the network connection to the end-user device such that the end-user device has the remaining portion of the selected digital content locally stored therein to be played when needed by the end-user device (note: the download step may only be permitted after the user of the end-user device has purchased and begun to play the pushed predetermined portion of the selected digital content). The method has an advantage in that it prevents the waste of the network's bandwidth and the end-user device's storage by not downloading the remaining portion of the selected digital content in the event the user of the end-user device does not want to purchase or play the pushed predetermined portion of the selected digital content.

In yet another aspect, the present invention provides an end-user device for receiving a digital content over a network connection from a system. The end-user device comprising a storage unit, a processor, and a memory that stores processor-executable instructions where the processor interfaces with the memory and executes the processor-executable instructions to enable a first receiving operation, a first storing operation, a second receiving operation, a playing operation, a third receiving operations, a second storing operation, and a second playing operation. The first receiving operation includes receiving a predetermined portion of the digital content over the network connection from the system (note: the end-user device may not have previously sent the system a request to receive the digital content or any portion thereof). The first storing operation includes storing the predetermined portion of the digital content within the storage unit. The second receiving operation includes receiving an instruction to begin playing the digital content. The first playing operation includes playing the predetermined portion of the digital content. The third receiving operation includes receiving a remaining portion of the digital content over the network connection from the system after the end-user device has begun to play the predetermined portion of the digital content that is locally stored in the storage unit (note: the third receiving operation may only be permitted after the user of the end-user device has purchased and begun to play the pushed predetermined portion of the selected digital content). The second storing operation includes storing the remaining portion of the digital content within the storage unit. The second playing operation includes playing the remaining portion of the digital content after playing the predetermined portion of the digital content. The end-user device has an advantage in that it prevents the waste of the network's bandwidth and the end-user device's storage by not downloading the remaining portion of the selected digital content in the event the user of the end-user device does not want to purchase or play the pushed predetermined portion of the selected digital content.

In still yet another aspect, the present invention provides a method (which is implemented by an end-user device) for receiving a digital content over a network connection from a system. The method comprises a first receiving step, a first storing step, a second receiving step, a playing step, a third receiving steps, a second storing step, and a second playing step. The first receiving step includes receiving a predetermined portion of the digital content over the network connection from the system (note: the end-user device may not have previously sent the system a request to receive the digital content or any portion thereof). The first storing step includes storing the predetermined portion of the digital content within the storage unit. The second receiving step includes receiving an instruction to begin playing the digital content. The first playing step includes playing the predetermined portion of the digital content. The third receiving step includes receiving a remaining portion of the digital content over the network connection from the system after the end-user device has begun to play the predetermined portion of the digital content that is locally stored in the storage unit (note: the third receiving operation may only be permitted after the user of the end-user device has purchased and begun to play the pushed predetermined portion of the selected digital content). The second storing step includes storing the remaining portion of the digital content within the storage unit. The second playing step includes playing the remaining portion of the digital content after playing the predetermined portion of the digital content. The end-user device has an advantage in that it prevents the waste of the network's bandwidth and the end-user device's storage by not downloading the remaining portion of the selected digital content in the event the user of the end-user device does not want to purchase or play the pushed predetermined portion of the selected digital content.

Additional aspects of the invention will be set forth, in part, in the detailed description, figures and any claims which follow, and in part will be derived from the detailed description, or can be learned by practice of the invention. It is to be understood that both the foregoing general description and the following detailed description are exemplary and explanatory only and are not restrictive of the invention as disclosed.

BRIEF DESCRIPTION OF THE DRAWINGS

A more complete understanding of the present invention may be obtained by reference to the following detailed description when taken in conjunction with the accompanying drawings.

DETAILED DESCRIPTION

Figure 1:
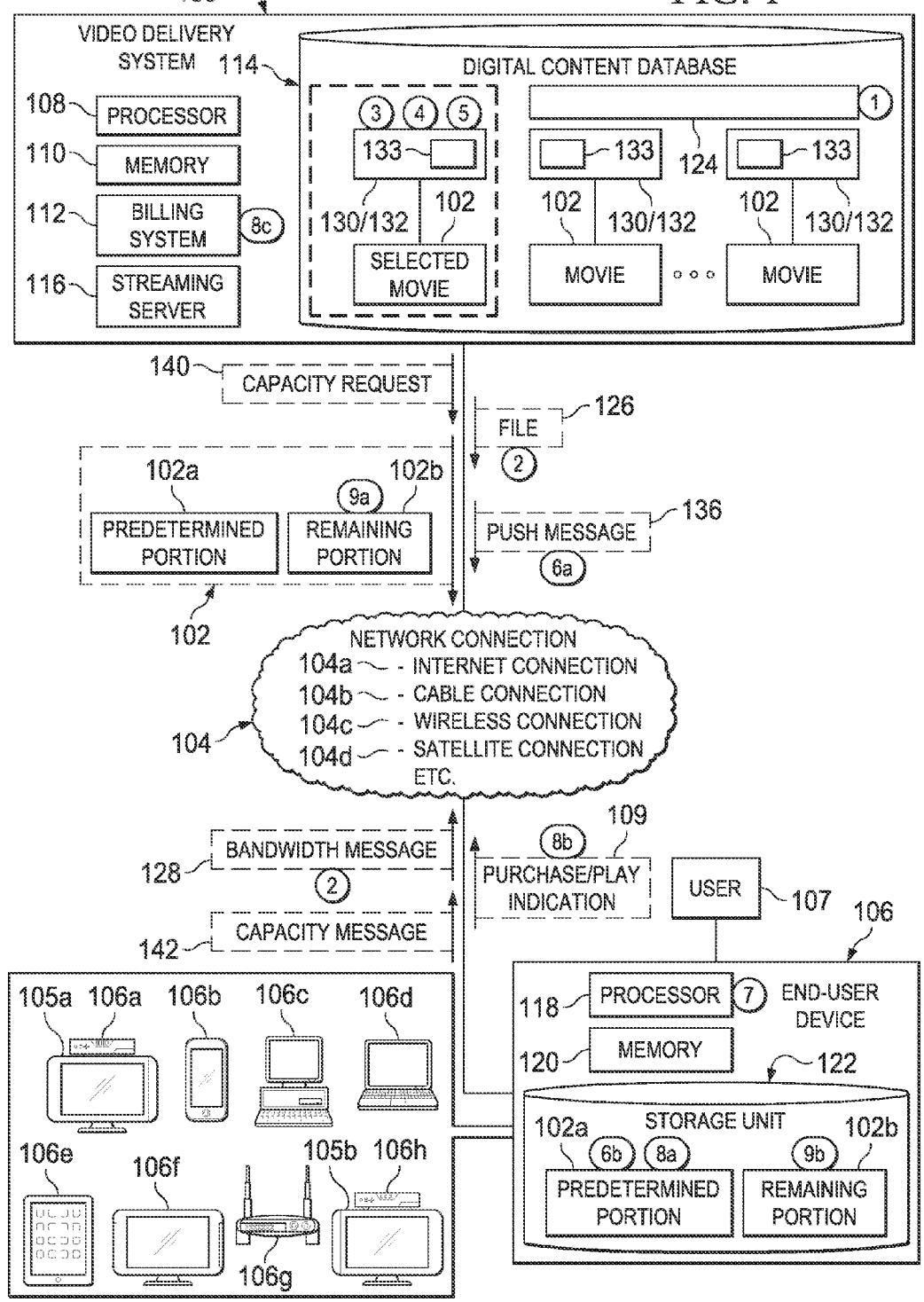
FIG. 1 is a basic diagram illustrating a video delivery system configured for delivering a selected movie (or other digital content) over a network connection to an end-user device in accordance with an embodiment of the present invention.

Referring to FIG. 1, there is a basic diagram illustrating a video delivery system 100 configured for delivering a movie 102 (e.g., digital content 102) over a network connection 104 to an end-user device 106 in accordance with an embodiment of the present invention. The video delivery system 100 (e.g., video-on-demand system 100, back office system 100) is shown as having a processor 108, a memory 110, a billing system 112, a digital content database 114, and a streaming server 116 (e.g., HTTP adaptive bitrate streaming server 116). The network connection 104 may be any type of connection including anyone or combination of for example an internet connection 104a, a cable connection 104b, a wireless connection 104c, and a satellite connection 104d. The end-user device 106 (e.g., set-top-box 106a (connected to television 105a), computer 106b, laptop computer 106c, mobile phone 106d (smart phone 106d), tablet 106e, internet capable television 106f, gateway device 106g, digital video recorder 106h (connected to television 105b) etc. . . . ) is shown as having a processor 118, a memory 120, and a storage unit 122. It should be appreciated that the video delivery system 100 and the end-user device 106 each could include various other well-known components but only the components which are needed to explain and enable the present invention are described herein.

The video delivery system 100 operates to efficiently and autonomously "push" or "pre-load" a predetermined portion 102a of the movie 102 (e.g., most frequently watched digital content 102) over at least one network connection 104 to the end-user device 106 (note: the video delivery system 100 is shown as delivering a movie 102 to one end-user device 106 but it should be understood that the video delivery system 100 is configured to deliver one or more movies 102 to one or more end-user devices 106). The amount of a selected movie 102 that is "pushed" or "pre-loaded" to this specific end-user device 106 is based on the available bandwidth of the network connection 104 to that end-user device 106. For example, if the movie 102 was 3 GB (gigabyte) for the HD (high-definition) version of a one hour movie, and the end-user device 106 has a 1 MB (megabyte) internet connection 104a, it would take 4.5 hours to download the movie 102. In the present invention, the operator's video delivery system 100 would autonomously "push" a predetermined amount 102a of the movie 102 to the end-user device 106 by first determining that the end-user device 106 has a 1 MB internet connection 104a and then determining that it would "push" 2.4 GB (for example) of the one hour movie knowing that after a user 107 of the end-user device 106 started to watch the movie 102 (e.g. purchased the movie 102) it would take 1 hour to download a 650 MB remaining portion 102b of the movie to the end-user device 106. In the event, that the user 107 of the end-user device 106 choose to purchase (or play) the movie 102, then the end-user device 106 would begin playing the previously "pushed" predetermined portion 102a of the movie 102. And, once the video delivery system 100 received an indication 109 that the user 107 has indeed purchased or otherwise begun playing the movie 102, then the video delivery service 100 would begin downloading the 650 MB remaining portion 102b of the movie 102 to the end-user device 106 such that this content would be ready to be played when the "pushed" predetermined portion 102a had finished being played by the end-user device 106. Alternatively, the end-user device 106 may not need to send the indication 109 to the video delivery system 100 in order to play the "pushed" predetermined portion 102a and then download the remaining portion 102b of the movie 102 (this feature is discussed in detail below). If desired, the present invention could also include a feature where the video delivery system 100 learns and analyzes the capacity (e.g., storage capacity) of the end-user device 106 to further maximize the efficiency of the delivery of the movie 102 to the end-user device 106, leading to better efficiency on the video delivery system 100, better efficiency on the end-user device 106, and better enjoyment by the user 107 of the end-user device 106.

A detailed discussion is provided next about an exemplary way that the video delivery system 100 and the end-user device 106 can each operate and advantageously utilize Hypertext Transfer Protocol (HTTP) Adaptive Bitrate Streaming technology to implement one embodiment of the present invention (note: a basic description about HTTP Adaptive Bitrate Streaming technology is provided in this document's appendix). In an HTTP Adaptive Bitrate Streaming Environment, the video delivery system 100 and the end-user device 106 could implement one embodiment of the present invention as follows:

1. The video delivery system 100 (e.g., video-on-demand system 100, back office system 100) queries content/movie title viewership information 124 which is shown as being stored in the digital content database 114 but could be stored in one or more remote databases to select one or more movies 102 (e.g., most frequently watched movie(s) 102) for "pushing" or "pre-loading" to the end-user device 106 (see step 1 in FIG. 1) (note: in this example only one movie 102 is selected to be "pushed" to the end-user device 106). The files for multiple movies 102 can also be stored and retrieved from the digital content database 114 or they can be stored and retrieved from one or more remote databases.

2. The video delivery system 100 determines the end-user device's average bandwidth on their network connection 104 to decide how much (e.g., the predetermined portion 102a) of the selected movie 102 to "push" or "pre-load" to the end-user device 106 (see step 2 in FIG. 1). For instance, the video delivery system 100 can determine the end-user device's average bandwidth by: (1) downloading a file 126 of a known size over the network connection 104 to the end-user device 106; and (2) receiving from the end-user device 106 a message 128 indicating the bandwidth of the network connection 104, where the bandwidth is based on a measurement of the download time of the file 126 by the end-user device 106.

3. The video delivery system 100 inspects the selected movie 102 and determines the runtime of the selected movie 102. For instance, the video delivery system 100 can determine the runtime of the selected movie 102 by: (1) taking into consideration the size of the segments 133 in seconds as indicated in a manifest 130 (or index file 130) and the number of segments 133 in the manifest 130 (or index file 130) associated with the selected movie 102; or (2) taking into consideration metadata 132 associated with the selected movie 102 (see step 3 in FIG. 1).

4. The video delivery system 100 determines a total file size for the selected movie 102 based for example on the sum of the file sizes of the segments 133 in the manifest 130 (or index file 130) associated with the selected movie 102 (see step 4 in FIG. 1).

5. The video delivery system 100 determines how much (e.g., the predetermined portion 102a) of the selected movie 102 to autonomously "push" or "pre-load" to the end-user device 106 based on at least: (1) the aggregate file size of all the segments 133 of the selected movie 102; (2) the runtime of the selected movie 102; and (3) the determined average bandwidth on the network connection 104 to the end-user device 106 (see step 5 in FIG. 1).

6. The video delivery system 100 sends a "push" message 136 to the end-user device 106. For instance, the message 136 can include: (1) the manifest 130 (or index file 130) for the selected movie 102 to be "pushed"; (2) the total number of segments 133 to pre-load within the end-user device's storage unit 122; and (3) an instruction for the end-user device 106 to "begin pulling" the predetermined portion 102a of the movie 102 (see step 6a in FIG. 1). The end-user device 106 begins pulling (downloading) the segments 133 as listed in the manifest 130 (or index file 130) and stores them within the storage unit 122 (see step 6b in FIG. 1). In other words, the video delivery system 100 effectively "pushes" or "pre-loads" the predetermined part 102a of the selected movie 102 to the end-user device 106.

7. Once, the end-device 106 has downloaded the number of segments 133 indicated in the "push" message 136 then the end-device 106 would stop downloading any further segments 133 associated with the selected movie 102 (see step 7 in FIG. 1). At this point in time, the user 107 of the end-user device 106 may not even know that the video delivery system 100 has "pushed" or "pre-loaded" the predetermined part 102a of the selected movie 102 to the end-user device 106.

8. Once, the user 107 instructs the end-user device 106 to begin playing the selected movie 102 (e.g., due to the end-user device 106 informing the user 107 about the "pushed" movie 102 and the user 107 purchasing the "pushed" movie 102), then the end-user device 106 operates as follows: (1) begins to play the selected movie 102 by accessing the locally stored segments 133 associated with the "pre-loaded" predetermined portion 102a of the movie 102 (see step 8a in FIG. 1); and (2) send a "purchase" message 109 to the video delivery system 100 indicating that the end-user device 102 has begun to play the selected movie 102 by accessing the locally stored segments 133 associated with the "pre-loaded" predetermined portion 102a of the movie 102 (see step 8b in FIG. 1). The video delivery system 100 upon receiving the "purchase" message 109 may forward the message 109 to the billing system 112 which adds a fee to the account of the user 107 (see step 8c in FIG. 1).

9. The video delivery system 100 upon receiving the "purchase" message 109 would permit and begin providing (downloading) the remaining portion 102b of the selected movie 102 over the network connection 104 to the end-user device 106 (see step 9a in FIG. 1). In particular, the end-user device 106 begins downloading the remaining segments 133 as listed in the manifest 130 (or index file 130) and stores them within the storage unit 122 (see step 9b in FIG. 1). In this way, the end-user device 106 has the remaining portion 102b of the selected movie 102 locally stored therein to be played when needed by the end-user device 106. In an alternative embodiment, the end-user device 106 does not need to send the "purchase" message 109 or any message for that matter to the video delivery system 100 before downloading the remaining portion 102b of the selected movie 102. In this case, the end-user device 106 would simply begin downloading the remaining segments 133 as listed in the manifest 130 (or index file 130) and store them within the storage unit 122 to be played when needed.

Figure 2:
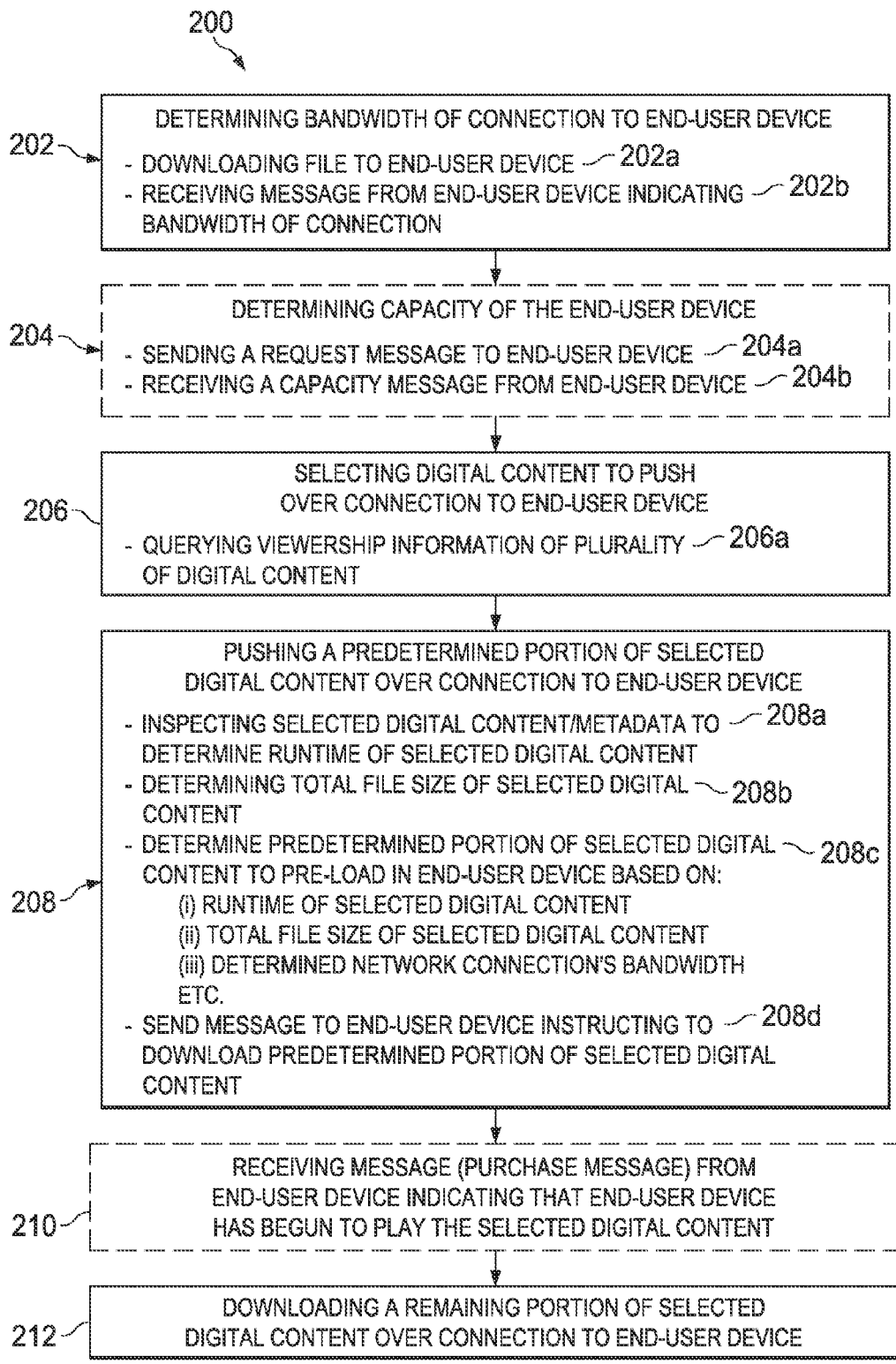
FIG. 2 is a flowchart of an exemplary method implemented by the video delivery system for delivering the selected movie (or other digital content) over the network connection to the end-user device in accordance with an embodiment of the present invention.

Referring to FIG. 2, there is shown a flowchart of an exemplary method 200 implemented by the video delivery system 100 for delivering the selected movie 102 over the network connection 104 to the end-user device 106 in accordance with an embodiment of the present invention. In one example, the video delivery system's processor 108 interfaces with the memory 110 and executes processor-executable instructions stored within the memory 110 to implement the method 200 and enable the selected movie 102 to be effectively and efficiently delivered over the network connection 104 to the end-user device 106.

At step 202, the video delivery system 100 determines a bandwidth of the network connection 104 to the end-user device 106. For instance, the video delivery system 100 can determine the end-user device's average network bandwidth by: (1) downloading a file 126 of a known size over the network connection 104 to the end-user device 106 (step 202a); and (2) receiving from the end-user device 106 a message 128 indicating the bandwidth of the network connection 104, where the bandwidth is based on a measurement of the download time of the file 126 by the end-user device 106 (step 202b). The video delivery system 100 may also utilize other ways to determine the bandwidth of the network connection 104 to the end-user device 106.

At step 204 (optional), the video delivery system 100 can determine a capacity of the end-user device 106. For instance, the video delivery system 100 can determine the capacity of the end-user device 106 by (1) sending a request message 140 to the end-user device 106 (step 204a); and (2) receiving from the end-user device 106 a message 142 indicating the capacity of the storage unit 122 and if desired any other capabilities of the end-user device 106 (step 204b). Alternatively, the end-user device 106 can send information regarding its capacity in message 128 at the same time it sends information about its bandwidth to the video delivery system 100.

At step 206, the video delivery system 100 selects one of the movies 102 from a set of movies 102 to "push" over the network connection 104 to the end-user device 106. For instance, the video delivery system 100 can query viewership information 124 stored in the digital content database 114 (or a remote database) to select the movie 102 (e.g., most frequently watched movie 102) to "push" over the network connection 104 to the end-user device 106 (step 206a).

At step 208, the video delivery system 100 pushes the predetermined portion 102a of the selected movie 102 over the network connection 104 to the end-user device 106 (note: the predetermined portion 102a of the selected movie 102 to be pushed is determined based at least on the determined bandwidth connection to the end-user device 106 and possibly the determined capacity of the end-user device 106). For instance, the video delivery system 100 can perform the "push" operation by: (1) inspecting the selected movie 102 or metadata 132 associated therewith to determine a runtime of the selected movie 102 (step 208a); (2) determining a total file size for the selected movie 102 based on a sum of file sizes of segments 133 associated with the selected movie 102 (step 208b); (3) determining the predetermined portion 102a of the selected movie 102 to preload in the end-user device 106 based on (for example): (i) the runtime of the selected movie 102; (ii) the total file size of the selected movie 102; (iii) the determined bandwidth of the network connection 104 to the end-user device 106; and possibly (iv) the determined capacity of the end-user device 106 (step 208c); and (4) sending a message 136 to the end-user device 106, where the message 136 comprises: (1) a manifest 130 (or index file 130) for the selected movie 102; (2) a total number of segments 133 to pre-load; and (3) an instruction to the end-user device 106 to begin downloading the predetermined portion 102a of the selected movie 102 (step 208d).

At step 210 (optional), the video delivery system 100 receives a message 109 (e.g., "purchase" message 109) from the end-user device 106 indicating that the end-user device 106 has begun to play the predetermined portion 102a of selected movie 102 which is stored therein. If desired, the video delivery system 100 upon receiving the "purchase" message 109 may forward the message 109 to the billing system 112 which adds a fee to the account of the user 107.

At step 212, the video delivery system 100 upon receiving the "purchase" message 109 would begin downloading (providing) the remaining portion 102b of the selected movie 102 over the network connection 104 to the end-user device 106. In other words, the end-user device 106 begins downloading the remaining segments 133 as listed in the manifest 130 (or index file 130) and stores them within the storage unit 122. In this way, the end-user device 106 has the remaining portion 102b of the selected movie 102 locally stored therein to be played when needed by the end-user device 106. In an alternative embodiment, the end-user device 106 does not need to send the "purchase" message 109 or any message for that matter to the video delivery system 100 before downloading the remaining portion 102b of the selected movie 102. In this case, the end-user device 106 would simply begin downloading the remaining segments 133 as listed in the manifest 130 (or index file 130) and store them within the storage unit 122 to be played when needed.

Figure 3:
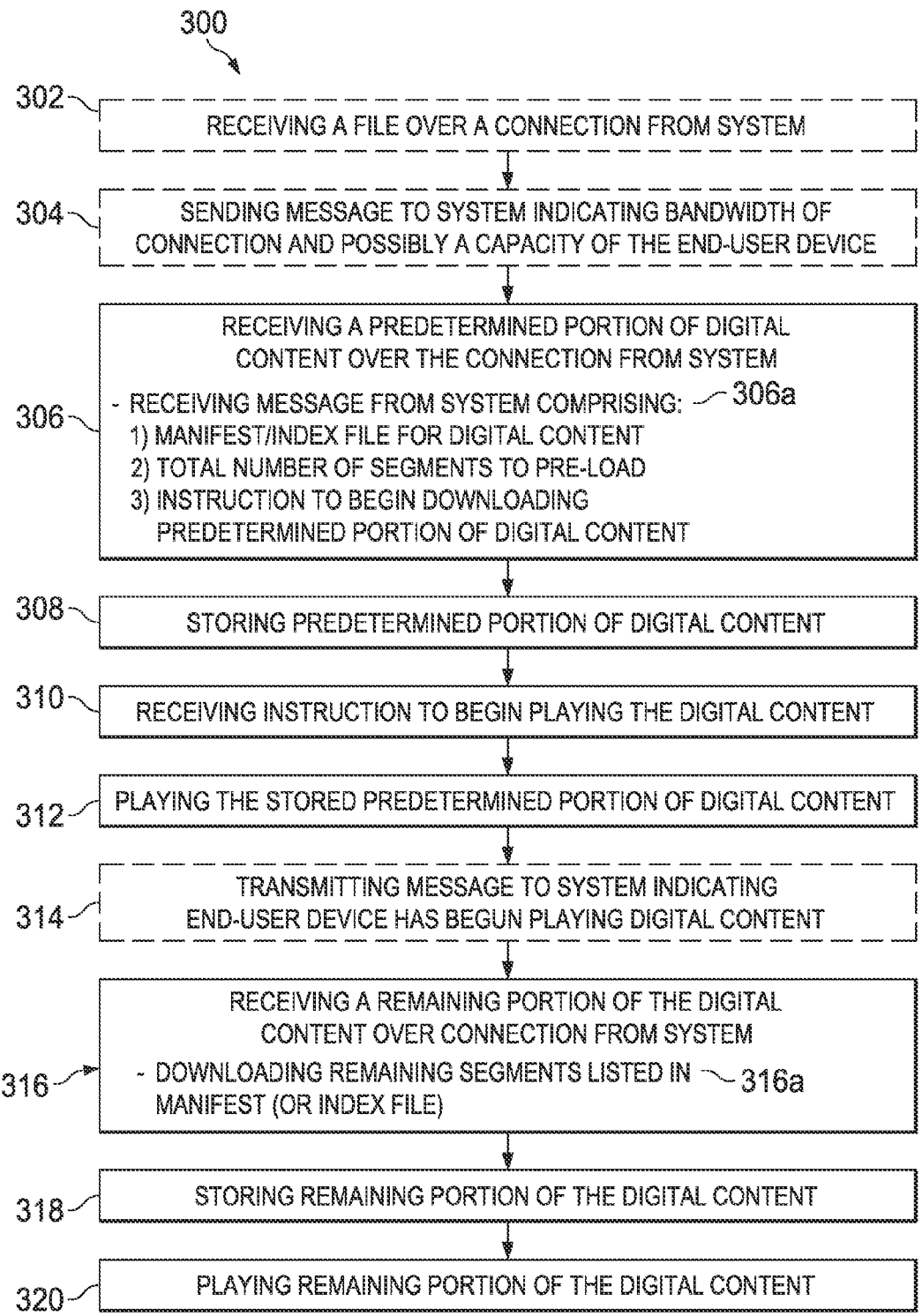
FIG. 3 is a flowchart of an exemplary method implemented by the end-user device for receiving the selected movie (or other digital content) over the network connection from the video delivery system in accordance with an embodiment of the present invention.

Referring to FIG. 3, there is shown a flowchart of an exemplary method 300 implemented by the end-user device 106 for receiving the selected movie 102 over the network connection 104 from the video delivery system 100 in accordance with an embodiment of the present invention. In one example, the end-user device's processor 118 interfaces with the memory 120 and executes processor-executable instructions stored within the memory 120 to implement the method 300 and efficiently enable the receipt of the selected movie 102 over the network connection 104 from the video delivery system 100.

At steps 302 and 304 (optional), the end-user device 106 receives (step 302) the file 126 of a known size sent over the network connection 104 from the video delivery system 100 and sends (step 304) the message 128 indicating the bandwidth of the network connection 104 to the video delivery system 100. In this case, the end-user device 106 would determine the bandwidth of the network connection 104 based on a measurement of the download time of the file 126. In addition, the end-user device 106 may also send the message 143 (or include it in message 128) to the video delivery system 100 indicating the capacity (e.g., space available) in the storage unit 122 and if desired any other capabilities of the end-user device 106 (step 204b).

At step 306, the end-user device 106 receives the "pushed" predetermined portion 102a of the selected movie 102 over the network connection 104 from the video delivery system 100 (note: the end-user device 106 does not need to send the video delivery system 100 a previous request to receive the predetermined portion 102a of the selected movie 102). For instance, the end-user device 106 can receive the "pushed" predetermined portion 102a of the selected movie 102 by: (1) receiving the message 136 from the video delivery system 100, where the message 136 comprises: (1) the manifest 130 (or index file 130) for the selected movie 102; (2) the total number of segments 133 to pre-load; and (3) the instruction to the end-user device 106 to begin downloading the predetermined portion 102a of the selected movie 102 (step 306a).

At step 308, the end-user device 106 stores the predetermined portion 102a of the selected movie 102 within the storage unit 122.

At step 310, the end-user device 106 receives an instruction to begin playing (e.g., displaying) the selected movie 102. For instance, the user 107 may press a key or otherwise interact with the end-user device 106 to indicate that they want to watch and possibly purchase the selected movie 102. To enable this, the end-user device 106 may display a message to the user 107 indicating that it has received the selected movie 102 (and possibly the cost for watching the selected movie 102) and if the user 107 wants to watch and possibly purchase the selected movie 102 then they need to press a certain button or speak a certain term into the end-user device 106.

At step 312, the end-user device 106 plays the predetermined portion 102a of the selected movie 102. For instance, if the end-user device 106 is a set-top-box 106a or video digital recorder 106h then it would begin playing the selected movie 102 on the corresponding television 105a or 105b. If the end-user device 106 is a mobile phone 106b (smart phone 106b), a computer 106c, a laptop computer 106d, a tablet 106f, or a internet-connected television 106g then the selected movie 102 would being playing on the end-user device's display.

At step 314 (optional), the end-user device 106 transmits the message 109 (e.g., the "purchase" message 109) to the video delivery system 100 indicating that the end-user device 106 has begun to play the predetermined portion 102a of the selected movie 102 that is locally stored in the storage unit 122. If desired, the end-user device 106 can perform step 314 before, after, or at the same time it is performing step 312.

At step 316, the end-user device 106 receives the remaining portion 102b of the selected movie 102 over the network connection 104 from the video delivery system 100 after the end-user device 106 has begun to play the predetermined portion 102a of the selected movie that is locally stored in the storage unit 122. For instance, the end-user device 106 may download the remaining segments 133 as listed in the manifest 130 (or index file 130) (step 316a). In one embodiment, the video delivery system 100 may need to receive the "purchase" message 109 before permitting the end-user device 106 to receive the remaining portion 102b of the selected movie 102. In an alternative embodiment, the end-user device 106 does not need to send the "purchase" message 109 or any message for that matter to the video delivery system 100 before downloading the remaining portion 102b of the selected movie 102.

At step 318, the end-user device 106 stores the remaining portion 102b of the selected movie 102 within the storage unit 122. In this way, the end-user device 106 has the remaining portion 102b of the selected movie 102 locally stored therein to be played when needed by the end-user device 106.

At step 320, the end-user device 106 plays the remaining portion 102b of the selected movie 102 after playing the predetermined portion 102a of the selected movie 102.

In view of the foregoing description, one skilled in the art will appreciate that the present invention comprises (1) the video delivery system 100 and method 200 for delivering the selected movie 102 via the network connection 104 to the end-user device 106, and (2) the end-user-device 106 and method 300 for receiving the selected movie 102 over the network connection 104 from the video delivery system 100. The present invention has many advantages some of which are as follows (for example):

(1) Many users 107 do not have a fast Internet connection 104; therefore, streaming high-definition or large movies, shows or other digital content 102 is difficult or impossible or provides a less-than-satisfactory (or, worse, terrible) user experience. The present invention's video delivery system 100 and method 200 addresses this problem by enabling the streaming of high-definition or large movies, shows or other digital content 102 in selected "high quality" predetermined portions 102a and 102b over a "slow" internet connection 104 to end-user devices 106.

(2) If an operator of the video delivery system 100 were to "push" an entire movie 102 (or other digital content 102) out to the end-user device 102 without knowing if the user 107 wanted to watch it or not, then this could result in wasted bandwidth and storage in the event the user 107 did not want to watch or purchase the "pushed" movie 102. The present invention's video delivery system 100 and method 200 addresses this problem by "pushing" or "pre-loading" only a predetermined portion 102a of the movie 102 (or digital content 102) to the end-user device 106 and then sending the remaining portion 102b of the movie 102 (or digital content 102) to the end-user device 106 only after the user 107 has indicated that they want to watch or purchase the "pushed" movie 102 (or digital content 102).

(3) The present invention allows the user 107 to enjoy a higher resolution version of the selected movie 102 than they otherwise would be able to view because of a slow network connection 104 by utilizing the adaptive nature of the HTTP Adaptive Bitrate Streaming technology.

It should be appreciated that the present invention is not limited to the aforementioned video delivery system 100 that delivers the selected movie 102 to the end-user device 106. Instead, the present invention may also comprise a system 100 (not necessarily a video delivery system 100 per se) that is configured to deliver any type of digital content 102 such as, for example, a musical composition, an application (e.g., smart phone application), or a file to the end-user device 106.

Although multiple embodiments of the present invention have been illustrated in the accompanying Drawings and described in the foregoing Detailed Description, it should be understood that the invention is not limited to the disclosed embodiments, but instead is also capable of numerous rearrangements, modifications and substitutions without departing from the present invention that as has been set forth and defined within the following claims.

APPENDIX

HTTP Adaptive Bitrate Streaming Technology

Adaptive bitrate streaming is a technique used by an adaptive streaming server for streaming multimedia over one or more networks to user devices (e.g., computers, mobile communication devices, tablets, smart phones). In the past most video streaming technologies utilized streaming protocols such Real-Time Transport Protocol (RTP) with Real-Time Streaming Protocol (RTSP). However, today's adaptive streaming technologies are mostly based on HTTP and are designed to work efficiently over large distributed HTTP networks such as the Internet.

HTTP adaptive bitrate streaming requires that the adaptive streaming server have multiple files of the content stream (source video, multimedia) which are encoded at different bitrates. The adaptive streaming server then switches between streaming the different encodings of the content file based on requests received from the user's device. The result of the HTTP stream is that the user's device experiences very little buffering and a fast start time so the user has a good experience for both high-end and low-end network connections. Today, there are several HTTP adaptive bitrate streaming technologies that can be used by an adaptive streaming server for streaming multimedia over networks such as the Internet to user devices. For example, Apple's HTTP Live Stream (HLS) m3u8 file system is one such HTTP adaptive bitrate streaming technology where a "manifest" file is created to reference many video segments which are updated in real time to play in a particular order. Other HTTP adaptive bitrate streaming technologies include Adobe's Dynamic stream for Flash. Microsoft's Smooth Streaming etc. . . .

Figure 4A:
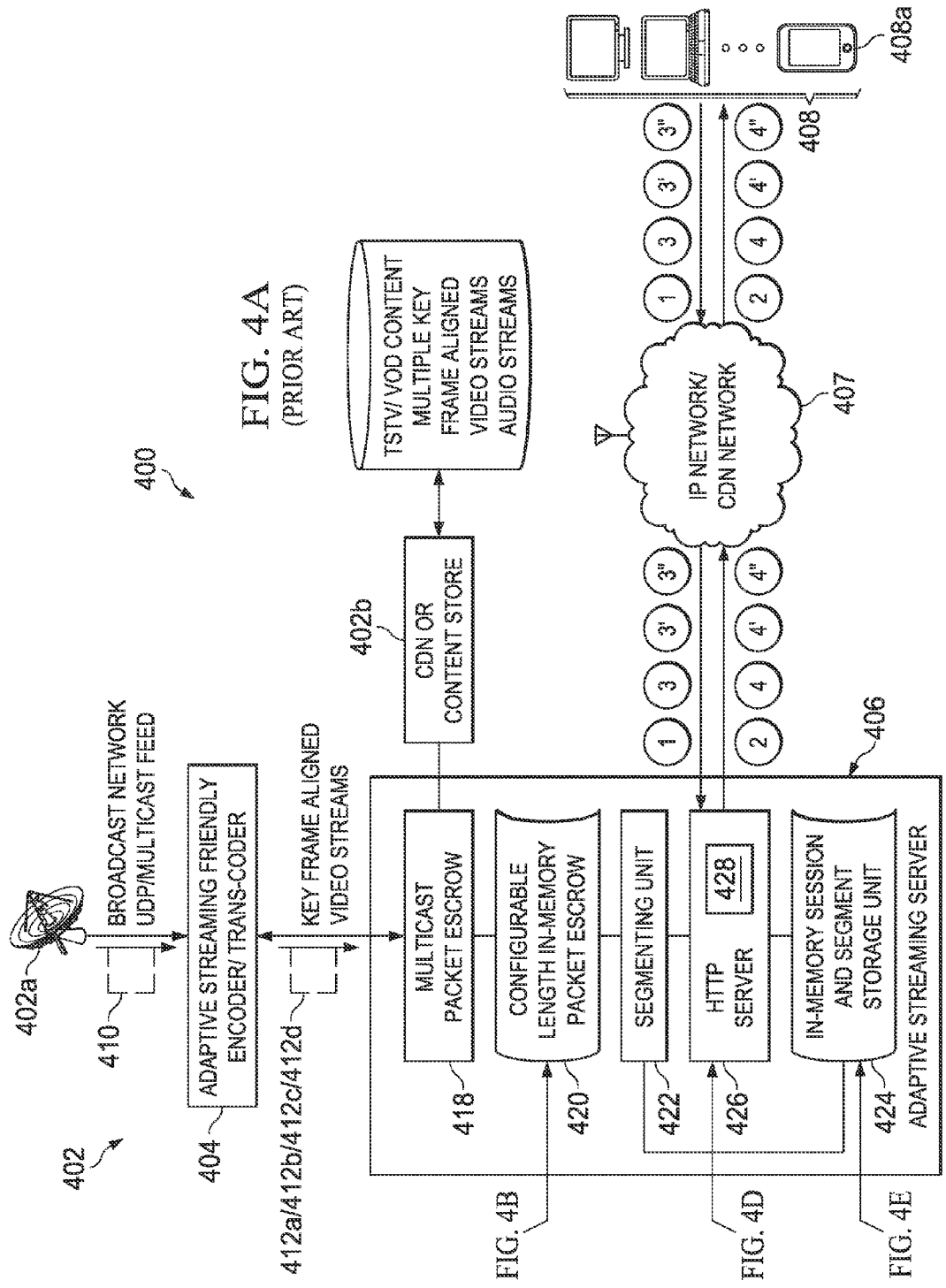
FIGS. 4A-4D (PRIOR ART) are several diagrams used to help explain the basics of HTTP Adaptive Bitrate Streaming technology and how this streaming technology if desired can be utilized by the video delivery system and the end-user device of the present invention.
Figure 4B:
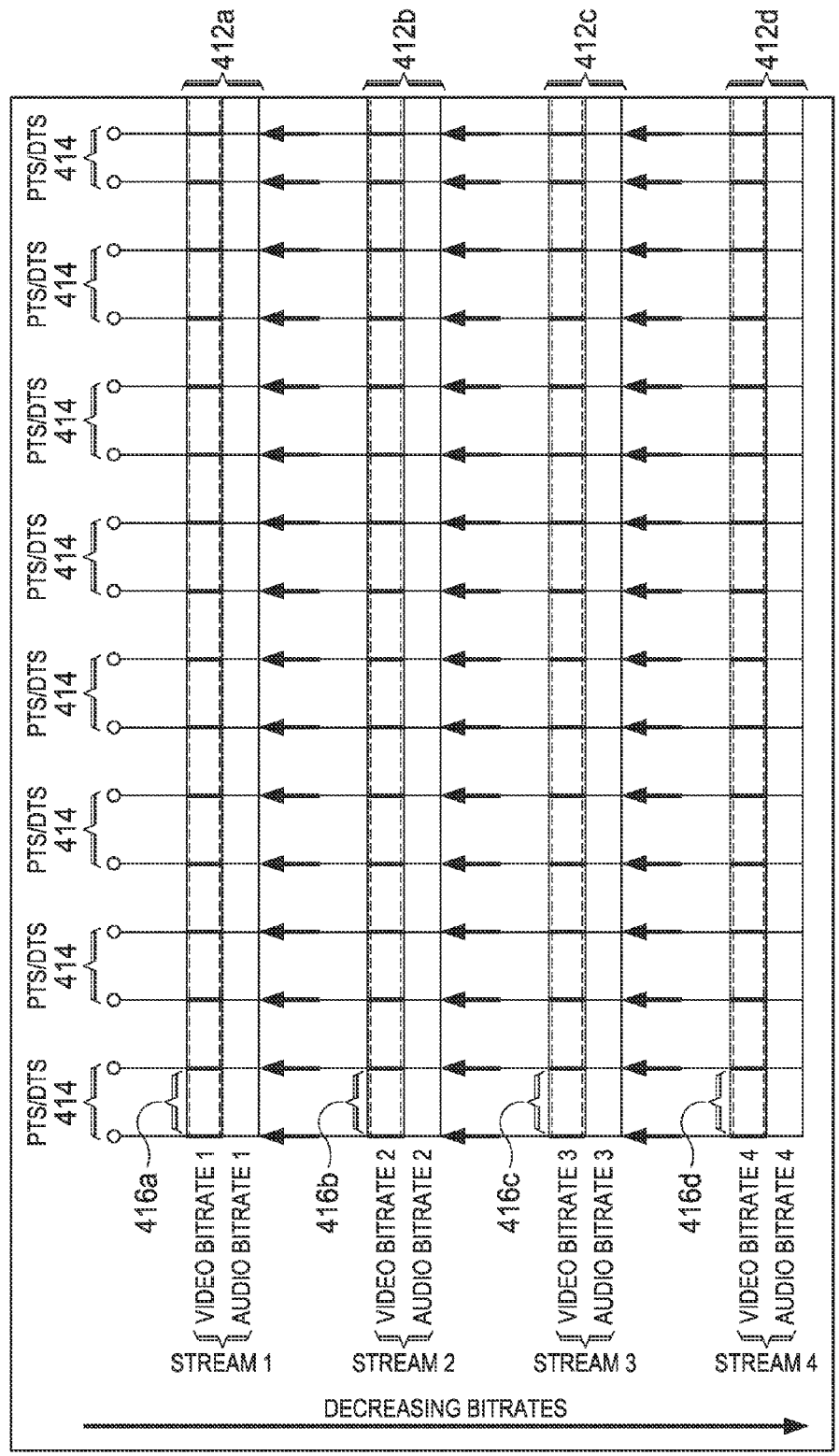
Figure 4C:
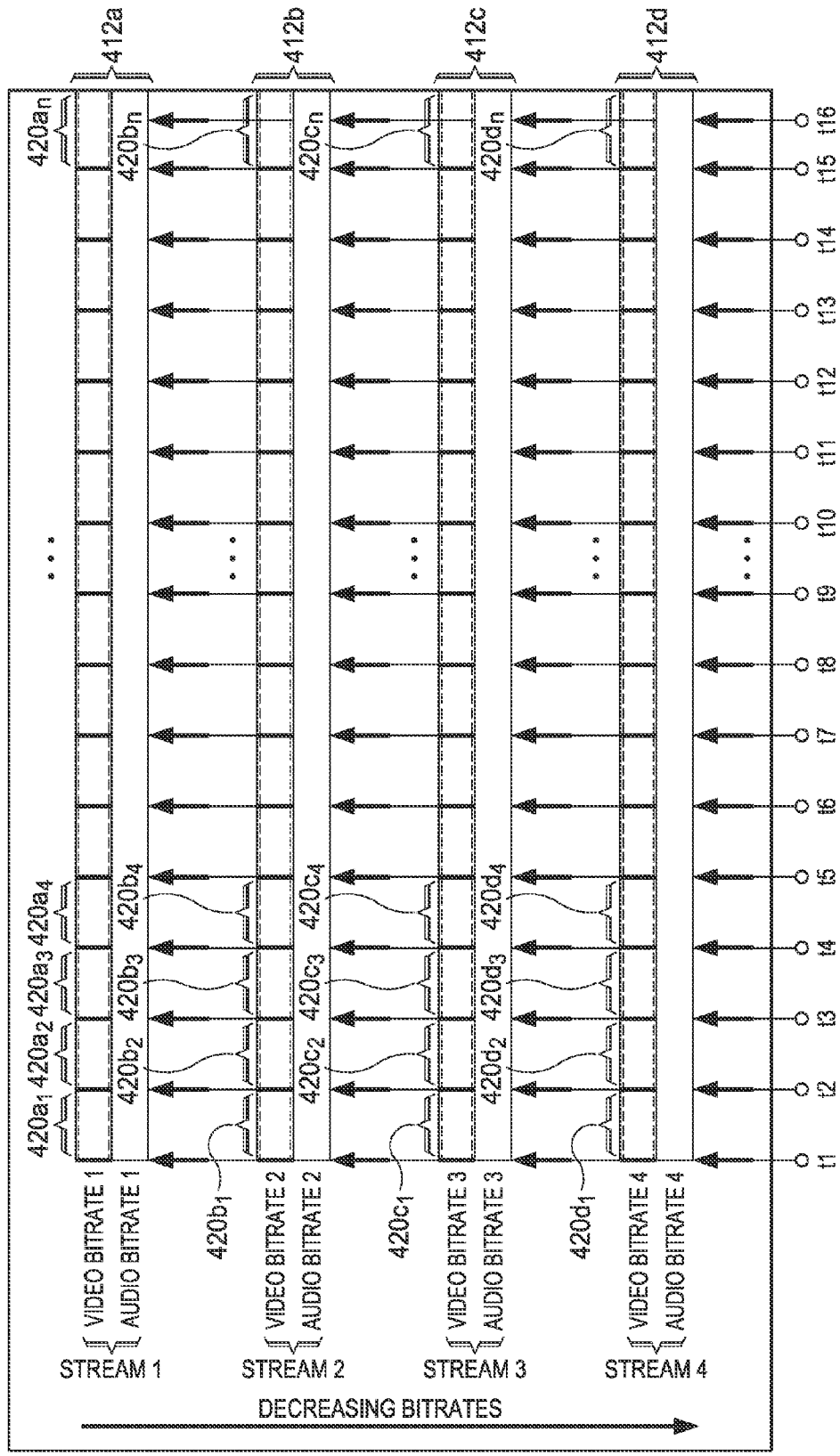

Referring to FIGS. 4A-4D (PRIOR ART), there several diagrams used to help explain how a traditional system 400 can implement a HTTP adaptive bitrate streaming technology. As shown in FIG. 4A (PRIOR ART), the traditional system 400 includes a content provider 402 (e.g., a broadcast network 402a, CDN/content store 402b), an adaptive streaming encoder/transcoder 404, an adaptive streaming server 406, a network 407 (e.g., IP network 407, CDN network 407), and clients 408. The adaptive streaming server 406 receives a request from a particular client 408a for a source video 410 and then retrieves the source video 410 from the content provider 402 (step 1). In this example, the broadcast network 402a has the requested source video 410 and provides the source video 410 to the adaptive streaming encoder/transcoder 404. The adaptive streaming encoder/transcoder 404 takes the source video 410 and generates multiple files 412a, 412b, 412c and 412d (for example) of the same video and audio content but which are encoded at different bitrates. For example, the adaptive streaming encoder/transcoder 404 can output a 4M bitrate file 412a, a 2M bitrate file 412b, a 1M bitrate file 412c and a 512K bitrate file 412d which are all key framed aligned with one another by PTSs/DTSs 414 (see FIG. 4B (PRIOR ART)). Thus, the 4M bitrate file 412a has a section 416a which contains the same video and audio content as the corresponding sections 416b, 416c and 416d of the 2M bitrate file 412b, the 1M bitrate file 412c and the 512K bitrate file 412d. However, the 4M bitrate file's section 416a has a higher quality than the 2M bitrate file's section 416b which has a higher quality than the 1M bitrate file's section 416c which in turn has a higher quality than the 512K bitrate file's section 416d.

The adaptive streaming server 406 includes a multicast packet escrow 418 which receives the multiple files 412a, 412b, 412c and 412d and a packet escrow database 420 which stores the multiple files 412a, 412b, 412c and 412d. The adaptive streaming server 406 includes a segmenting unit 422 which functions to segment each of the stored files 412a, 422b, 412c, and 412d into multiple segment files $420a_{1-n}$, $420b_{1-n}$, $420c_{1-n}$, and $420d_{1-n}$ (see FIG. 4C (PRIOR ART)). The adaptive streaming server 406 includes a segment database 424 which stores the segment files $420a_{1-n}$, $420b_{1-n}$, $420c_{1-n}$, and $420d_{1-n}$. Each segment file $420a_{1-n}$, $420b_{1-n}$, $420c_{1-n}$, and $420d_{1-n}$ contains video and audio packets for a predetermined time duration (e.g., 10 seconds). In this example, the segment files $420a_1$, $420b_1$, $420c_1$, and $420d_1$ (for example) would be associated with time codes t1-t2 and segment files $420a_4$, $420b_4$, $420c_4$, and $420d_4$ (for example) would be associated with time codes t4-t5.

Figure 4D:
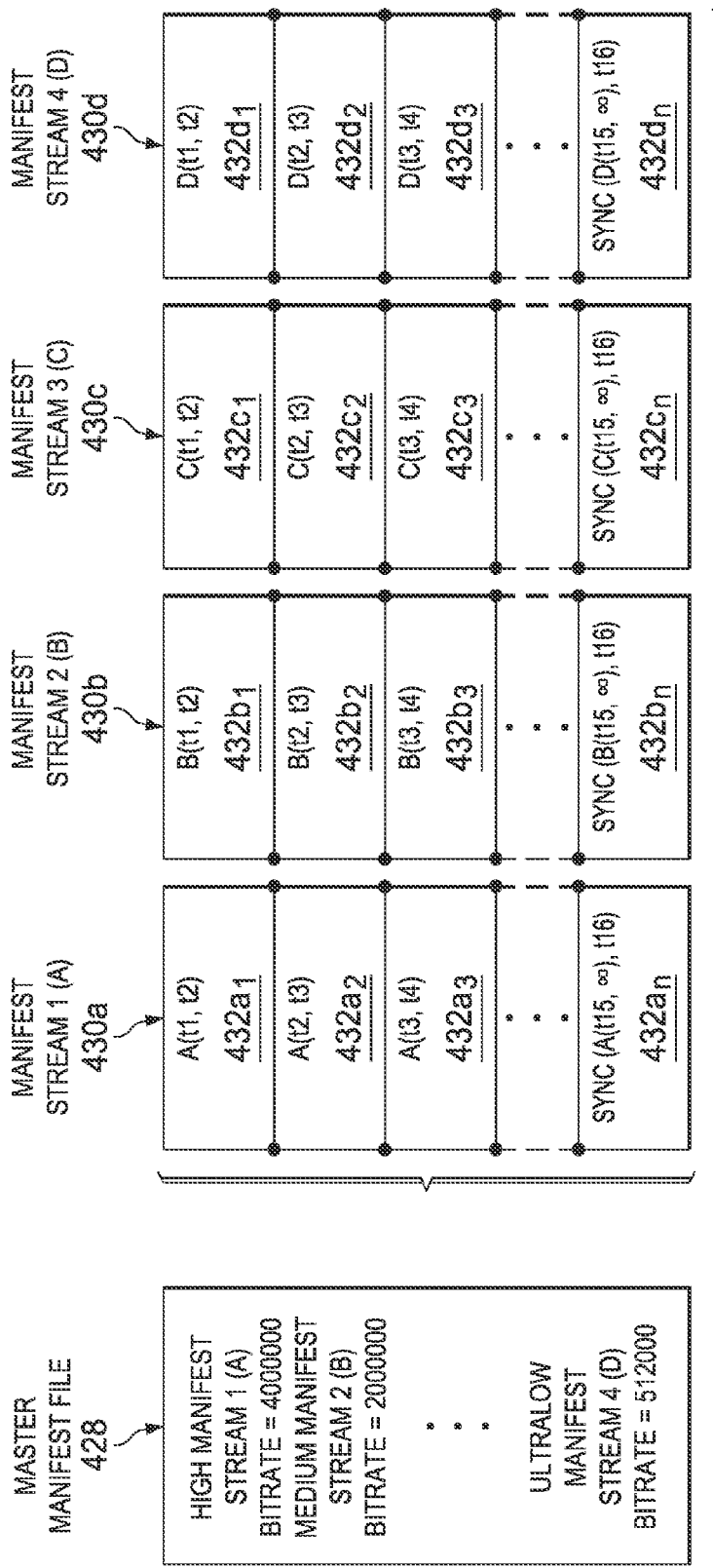

The adaptive streaming server 406 has a HTTP server 426 which interfaces with the segment database 424 and creates a master manifest file 428 which includes child manifest files 430a, 430b, 430c and 430d (for example) (see FIG. 4D (PRIOR ART)). Each child manifest file 430a, 430b, 430c and 430d respectively includes references $432a_{1-n}$, $432b_{1-n}$, $432c_{1-n}$, and $432d_{1-n}$ to each of the segment files $420a_{1-n}$, $420b_{1-n}$, $420c_{1-n}$, and $420d_{1-n}$. The HTTP server 426 sends the master manifest file 428 through the network 407 to client 408a (step 2). Thereafter, the client 408a sends a request including one of the child manifest file's reference $432a_1$ (for example) through the network 107 to the HTTP server 426 (step 3). The HTTP server 426 uses the requested reference $432a_1$ to retrieve and send the corresponding segment file $420a_1$ through the network 107 to the client 408a which plays the segment file $420a_1$ (step 4). The client 408a sends another request identifying one of the child manifest file's reference $432b_2$ (for example) through the network 107 to the HTTP server 426 (step 3'). The HTTP server 426 uses the requested references $432b_2$ to retrieve and send the corresponding segment file $420b_2$ through the network 107 to the client 408a which playbacks the segment file $420b_2$ (step 4'). The client 408a continues to send requests for specific segment files $420a_{3-n}$, $420b_{3-n}$, $420c_{3-n}$, and $420d_{3-n}$ (for example) and the HTTP server 426 sends the requested segment files $420a_{3-n}$, $420b_{3-n}$, $420c_{3-n}$, and $420d_{3-n}$ back to the client 408a which playbacks the received segment files $420a_{3-n}$, $420b_{3-n}$, $420c_{3-n}$, and $420d_{3-n}$ (steps 3'' and 4''). In this way, the client 408a is able to playback the requested source video 410 while experiencing very little buffering and a fast start time so the user has a good experience for both high-end and low-end network connections.

The aforementioned video delivery system 100 if desired could utilize the HTTP Adaptive Bitrate Streaming technology to perform steps 208 and 212. And, if desired the end-user device 106 could utilize the HTTP Adaptive Bitrate Streaming technology to perform steps 306 and 318.

The invention claimed is:

1. A system for delivering one of a plurality of digital content via a network connection to an end-user device, the system comprising: a processor; and a memory that stores processor-executable instructions, wherein the processor interfaces with the memory to execute the processor-executable instructions, whereby the system is operable to:
   determine a bandwidth of the network connection to the end-user device;
   select the one of the plurality of digital content to push over the network connection to the end-user device;
   push a predetermined portion of the selected digital content over the network connection to the end-user device, wherein the predetermined portion of the selected digital content to be pushed is determined based at least on the determined bandwidth of the network connection to the end-user device, whereby the system is further operable to perform the push operation by:
   inspecting the selected digital content or metadata associated therewith to determine a runtime of the selected digital content;
   determining a total file size for the selected digital content based on a sum of file sizes of segments associated with the selected digital content;
   determining the predetermined portion of the selected digital content to preload in the end-user device based at least on: (1) the runtime of the selected digital content; (2) the total file size of the selected digital content; and (3) the determined bandwidth of the network connection to the end-user device; and
   sending a message to the end-user device, where the message comprises: (1) a manifest or index file for the selected digital content; (2) a total number of segments to pre-load; and (3) an instruction to the end-user device to begin downloading the predetermined portion of the selected digital content; and download a remaining portion of the selected digital content over the network connection to the end-user device such that the end-user device has the remaining portion of the selected digital content locally stored therein to be played when needed by the end-user device.

2. The system of claim 1, wherein the system is further operable to:

receive a message from the end-user device indicating that the end-user device has begun to play the selected digital content that is locally stored in the end-user device before enabling the download operation.

3. The system of claim 2, wherein the message received from the end-user device indicating that the end-user device has begun to play the selected digital content is a message indicating that a user of the end-user device wants to purchase the digital content.

4. The system of claim 1, wherein the system is further operable to:

determine a capacity of the end-user device, wherein the determined capacity is also used in determining the predetermined portion of the selected digital content to be pushed to the end-user device.

5. The system of claim 1, wherein the system is further operable to perform the bandwidth determine operation by:

downloading a file of a known size over the network connection to the end-user device; and receiving from the end-user device a message indicating the bandwidth of the network connection, wherein the bandwidth is based on a measurement of a download time of the file by the end-user device.

6. The system of claim 1, wherein the system is further operable to perform the select operation by querying viewership information of the plurality of digital content.

7. The system of claim 1, further comprising a Hypertext Transfer Protocol (HTTP) adaptive bitrate streaming server that takes part in the push operation and the download operation.

8. The system of claim 1, wherein the system is further operable to perform the selected operation and the push operation without receiving any instructions from the end-user device requesting performance of the select operation or the push operation.

9. The system of claim 1, wherein the selected digital content is one of a movie, a musical composition, an application, or a file.

10. The system of claim 1, wherein the end-user device is one of following: a set-top-box, a mobile phone/smart phone, a computer, a laptop computer, a tablet, a internet-connected television, a gateway device, or a digital video recorder.

11. The system of claim 1, wherein the network connection is one of following: an internet connection, a cable connection, a wireless connection, or a satellite connection.

12. A method implemented by a system for delivering one of a plurality of digital content via a network connection to an end-user device, the method comprising steps of:

determining, by the system, a bandwidth of the network connection to the end-user device;

selecting, by the system, the one of the plurality of digital content to push over the network connection to the end-user device;

pushing, by the system, a predetermined portion of the selected digital content over the network connection to the end-user device, wherein the predetermined portion of the selected digital content to be pushed is determined based at least on the determined bandwidth of the network connection to the end-user device, wherein the pushing step further comprises:

inspecting the selected digital content or metadata associated therewith to determine a runtime of the selected digital content;

determining a total file size for the selected digital content based on a sum of file sizes of segments associated with the selected digital content;

determining the predetermined portion of the selected digital content to preload in the end-user device based at least on: (1) the runtime of the selected digital content; (2) the total file size of the selected digital content; and (3) the determined bandwidth of the network connection to the end-user device; and sending a message to the end-user device, where the message comprises: (1) a manifest or index file for the selected digital content; (2) a total number of segments to pre-load; and (3) an instruction to the end-user device to begin downloading the predetermined portion of the selected digital content; and downloading, by the system, a remaining portion of the selected digital content over the network connection to the end-user device such that the end-user device has the remaining portion of the selected digital content locally stored therein to be played when needed by the end-user device.

13. The method of claim 12, further comprising a step of receiving, by the system, a message from the end-user device indicating that the end-user device has begun to play the selected digital content that is locally stored in the end-user device before performing the downloading step.

14. The method of claim 13, wherein the message received from the end-user device indicating that the end-user device has begun to play the selected digital content is a message indicating that a user of the end-user device wants to purchase the digital content.

15. The method of claim 12, further comprising a step of determining a capacity of the end-user device, wherein the determined capacity is also used in determining the predetermined portion of the selected digital content to be pushed to the end-user device.

16. The method of claim 12, wherein the selecting step further comprises a step of querying viewership information of the plurality of digital content.

17. The method of claim 12, wherein the bandwidth determining step further comprises steps of:

downloading a file of a known size over the network connection to the end-user device; and receiving from the end-user device a message indicating the bandwidth of the network connection, wherein the bandwidth is based on a measurement of a download time of the file by the end-user device.

18. The method of claim 12, wherein the pushing step and the downloading step are performed at least in part by a Hypertext Transfer Protocol (HTTP) adaptive bitrate streaming server.

19. The method of claim 12, wherein the selecting step and the pushing step are performed without receiving any instructions from the end-user device requesting performance of the selecting step of the pushing step.

20. The method of claim 12, wherein the selected digital content is one of a movie, a musical composition, an application, or a file.

21. The method of claim 12, wherein the end-user device is one of following: a set-top-box, a mobile phone/smart phone, a computer, a laptop computer, a tablet, a internet-connected television, a gateway device, or a digital video recorder.

22. The method of claim 12, wherein the network connection is one of following: an internet connection, a cable connection, a wireless connection, or a satellite connection.

\* \* \* \* \*